US007500191B2

(12) United States Patent  
Rosenberg

(10) Patent No.: US 7,500,191 B2  
(45) Date of Patent: *Mar. 3, 2009

(54) SYSTEMS AND METHODS FOR USING MEDIA UPON INSERTION INTO A DATA PROCESSING SYSTEM

(75) Inventor: Alexander M. Rosenberg, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 11/497,469

(22) Filed: Jul. 31, 2006

(65) Prior Publication Data

US 2006/0265655 A1 Nov. 23, 2006

Related U.S. Application Data

(63) Continuation of application No. 09/757,406, filed on Jan. 8, 2001, now Pat. No. 7,100,113.

(51) Int. Cl.  
*G06F 3/00* (2006.01)

(52) U.S. Cl. ....................... 715/704; 715/723

(58) Field of Classification Search ......... 715/835–837, 715/769–770, 716–729, 704  
See application file for complete search history.

(56) References Cited

U.S. PATENT DOCUMENTS

| | | | | | |
|---|---|---|---|---|---|
| 5,611,066 | A | * | 3/1997 | Keele et al. ................. | 711/100 |
| 5,819,103 | A | * | 10/1998 | Endoh et al. .................. | 710/1 |
| 5,835,297 | A | * | 11/1998 | Moore et al. .................. | 360/69 |
| 5,931,906 | A | * | 8/1999 | Fidelibus et al. ............. | 709/217 |
| 5,946,277 | A | * | 8/1999 | Kuroda et al. ............. | 369/30.05 |
| 6,091,675 | A | * | 7/2000 | Lee .......................... | 369/30.36 |
| 6,179,487 | B1 | * | 1/2001 | Bardon et al. ............... | 345/841 |
| 6,246,401 | B1 | * | 6/2001 | Setogawa et al. ........... | 715/723 |
| 6,317,779 | B1 | * | 11/2001 | Gile et al. .................... | 709/217 |
| 6,449,226 | B1 | * | 9/2002 | Kumagai .................... | 369/47.1 |
| 6,532,198 | B1 | * | 3/2003 | Miller ...................... | 369/30.43 |
| 6,587,404 | B1 | * | 7/2003 | Keller et al. ............. | 369/30.06 |
| 6,621,768 | B1 | * | 9/2003 | Keller et al. ............. | 369/30.05 |
| 6,661,763 | B2 | * | 12/2003 | Kurashina et al. ........ | 369/59.25 |

(Continued)

OTHER PUBLICATIONS

Screen Dumps of Microsoft Word (2000, pp. 1-4).*

(Continued)

*Primary Examiner*—Kevin Nguyen  
(74) *Attorney, Agent, or Firm*—Blakely, Sokoloff, Taylor & Zafman LLP

(57) ABSTRACT

Methods and apparatuses for operating with writeable media. In one aspect of the invention, an exemplary method includes inserting a writeable media into a drive system which is coupled to a data processing system, instructing the data processing system to write or erase first data on the writeable media, and instructing the data processing system to eject the writeable media from the drive system, wherein upon the instructing of the data processing system to eject, the data processing system writes or erases the first data on the writeable media. The present invention includes other methods and apparatuses which perform at least one of these methods, including data processing systems which perform at least one of these methods and computer readable media which when executed on data processing systems cause the systems to perform at least one of these methods.

12 Claims, 6 Drawing Sheets

U.S. PATENT DOCUMENTS

| | | | |
|---|---|---|---|
| 6,678,227 B1* | 1/2004 | Kondo et al. | 369/47.33 |
| 2001/0047454 A1* | 11/2001 | Soderstrom et al. | 711/118 |
| 2001/0054134 A1* | 12/2001 | Nagatomo et al. | 711/163 |
| 2002/0051019 A1 | 5/2002 | DeVorchik et al. | |
| 2003/0023287 A1* | 1/2003 | Edwards et al. | 607/101 |

OTHER PUBLICATIONS

Screen Dumps of Microsoft CD Player, Version 4.0 (pp. 1-2, 1998).*

Devorchik, et al., U.S. Appl. No. 60/244,830, 6 pages.

Paul Thurrott's Supersite for Windows:Whistler Build 2410: On the Road to Beta 2, 5 pgs, found at http://www.winsupersite.com/reviews/whistler_2410.asp.

roxio Toast 4 Deluxe Features, 2 pgs, found at http://www.roxio.com/en/products/toast/toast features.html.

roxio Easy CD Deluxe Features, 2 pgs, found at http://www.roxio.com/en/products/ecdc/ecdcfeatures.html.

roxio DirectCD Features, 1 pg, found at http://www.roxio.com/en/products/ecdc/dcdfeatures.html.

* cited by examiner

SYSTEMS AND METHODS FOR USING MEDIA UPON INSERTION INTO A DATA PROCESSING SYSTEM

This application is a continuation of U.S. patent application Ser. No. 09/757,406, filed Jan. 8, 2001 now U.S. Pat. No. 7,100,113.

FIELD OF THE INVENTION

The present invention relates to the field of data processing systems and, in one embodiment, more particularly to data processing systems which can accept a blank disk in a drive system coupled to the data processing system.

BACKGROUND OF THE INVENTION

Data processing systems, such as computer systems, often include a drive system which can read information off of optical disks such as CD-ROM disks and CD-R disks, and CD-RW disks and DVD disks. Further, these drive systems can write data such as digital computer files or audio files, to these disks when the disks are writeable, such as CD-R and CD-RW disks. Typical existing data processing systems which provide these capabilities typically use an application program which is separate from the operating system of the computer system and which provides the necessary instructions and control for writing data to these disks. It will be recognized that the term "burning" is often used to describe the process of writing data to such disks. Examples of such software programs include: Toast from Adaptec of Milpitas, Calif., as well as DirectCD, also from Adaptec and the program EasyCD Creator also from Adaptec of Milpitas, Calif.

FIG. 1 shows an example of a typical method in using one of these programs such as the program known as Toast which runs on Macintosh computers from Apple Computer of Cupertino, Calif. The method of FIG. 1 begins in Operation 10 in which the CD burning software, such as, Toast or EasyCD Creator is launched on the computer system. This typically means that the user has double clicked on the icon representing the program or, through some other technique, has selected the program for execution on the computer system. Then in Operation 12, a window appears on a display device on a computer system, which window provides output from the CD-burning software and also allows for input from the user. In Operation 14, the user may drag and drop files and/or folders from the computer system's desktop interface (e.g. the Macintosh Finder desktop graphical user interface or the Windows Explorer graphical user interface which appears on so called Windows computer systems) on to the window for CD-burning software. Then in Operation 16, the user typically selects a burn command and the computer responds in Operation 18 by prompting the user to insert a blank CD-R disk or blank CD-RW disk into the CD-R or CD-RW drive system. After the insertion of the disk, the system burns the CD-R disk or CD-RW disk by writing files and/or folders onto the CD-R or CD-RW disk, and then the system will typically eject the disk. While a software program such as Toast allows for a Macintosh computer system to burn CD-R disks and CD-RW disks, the user experience with the program in certain respects does not match the user experience with a Macintosh when a blank media is inserted into a drive system. For example, when a blank floppy disk or a blank Zip disk is inserted into a drive system of a Macintosh computer system, the computer system will automatically in response to the insertion recognize the insertion of the blank media and ask the user to select, from a window, between the ejection of the media or the further use of the media, which may require a formatting of the media. In the case of Toast, the insertion of the blank CD-R or CD-RW disk will not result in such window interface. Furthermore, if the user does select, from the window, to use the disk rather then to eject it, an icon representing the disk will automatically, in response to the selection of use of the disk, appear on the desktop interface of the Macintosh. At this time, the icon on the desktop may be directly used to write data to or remove data from the media (e.g. by dragging and dropping operations or by cutting and pasting operations as are well known in the art).

The software program DirectCD does in some respect provide further functionality beyond Toast by recognizing automatically the insertion of a blank CD-R or a blank CD-RW disk into a drive system. However, this software uses a nonstandard format in burning data and burns the data as the user instructs the system to copy files to the disk.

SUMMARY OF THE INVENTION

Methods and apparatuses for operating with writeable media are described here. In one aspect of the invention, an exemplary method includes inserting a writeable media into a drive system which is coupled to a data processing system, instructing the data processing system to write or erase first data on the writeable media, and instructing the data processing system to eject the writeable media from the drive system, wherein upon the instructing of the data processing system to eject, the data processing system writes or erases the first data on the writeable media.

In another aspect of the invention, an exemplary method includes inserting a blank writeable media into a drive system which is coupled to the data processing system, and displaying automatically, in response to the inserting and on a display device coupled to the data processing system, a prompt to a user with at least three selectable options which allow the user to (1) eject the blank once writeable media from the drive system or (2) use the blank once writeable media in the drive system or (3) launch an audio CD creation program.

In another aspect of the invention, an exemplary method includes inserting a blank writeable media into the drive system which is coupled to a data processing system, and creating automatically, in response to the inserting, a data file on a storage device which is coupled to the data processing system prior to writing data to the blank writeable media.

The present invention includes apparatuses which perform at least one of these methods, including data processing systems which perform at least one of these methods and computer readable media which when executed on data processing systems cause the systems to perform at least one of these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Figure 1:
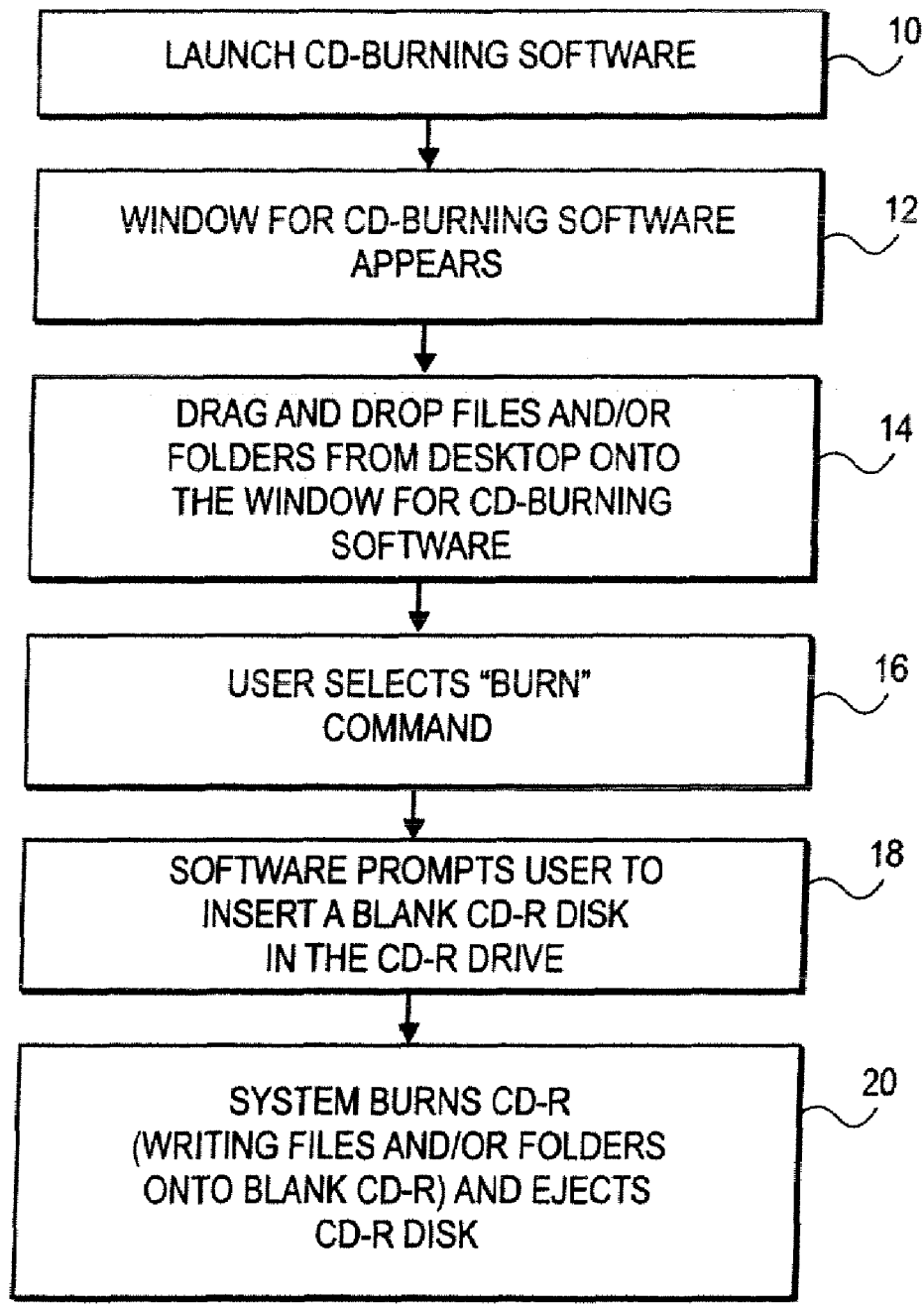
FIG. 1 shows a method in the prior art for burning a CD-R disk, which is a form of a write-once media.
Figure 2:
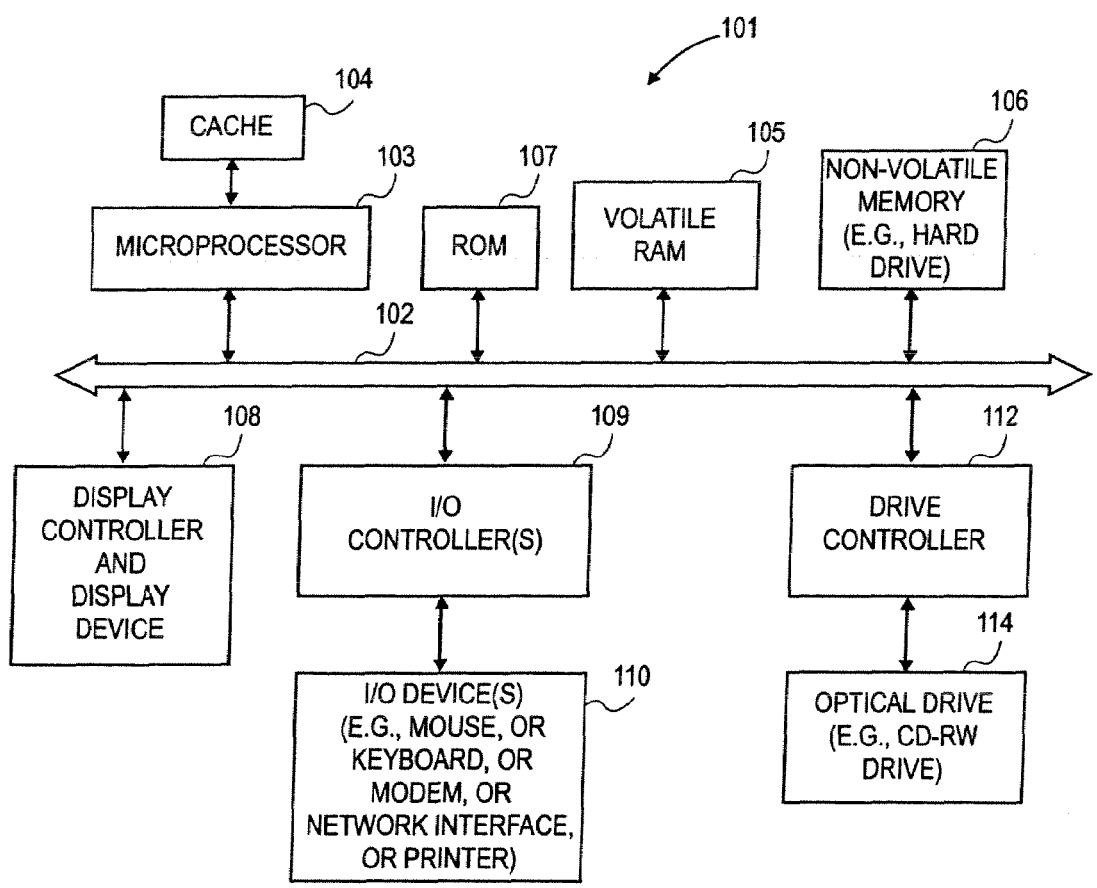
FIG. 2 shows a block diagram example of data processing system which may be used with the present invention.

FIG. 2 shows one example of a typical computer system which may be used with the present invention. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 2 may, for example, be an Apple Macintosh computer.

As shown in FIG. 2, the computer system 101, which is a form of a data processing system, includes a bus 102 which is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 2. The bus 102 interconnects these various components together and also interconnects these components 103, 107, 105, and 106 to a display controller and display device 108 and to peripheral devices such as input/output (I/O) devices which may be mice, keyboards, modems, network interfaces, printers and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive which maintains data even after power is removed from the system and which is used as the "boot" drive to start up the system from a cold start by loading all necessary software (e.g. low level hardware drivers, disk operating systems, a windows graphical user interface, etc.) into the volatile RAM 105. Typically, the non-volatile memory will also be a random access memory although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals. The system 101 also includes a drive controller 112 and a drive 114 which may be one of the various forms of an optical drive such as a CD-R drive, or a CD-RW drive or a DVD rewriteable drive which is also a CD-RW drive. The drive controller 112 provides an interface between the bus 102 and the drive 114 which may be any one of the known, conventional controllers and drives which are used with computer systems. The drive 114 typically accepts a computer readable storage media such a CD-R optical disk or a CD-RW optical disk through either a slot loading mechanism or a tray loading mechanism.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103 or a processor in drive controller 112 or a combination of processors.

Figure 3:
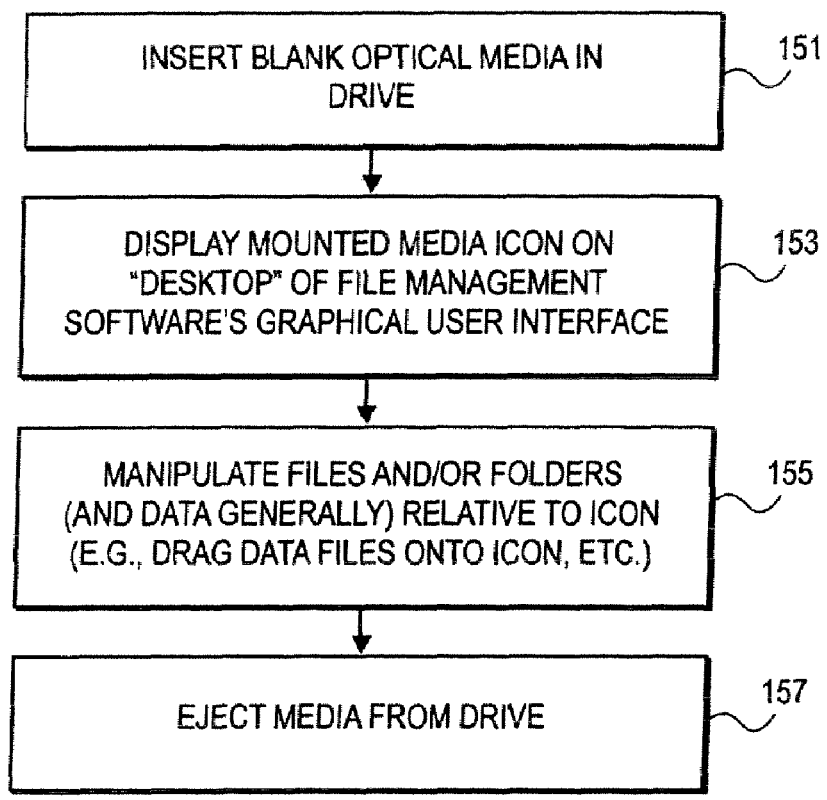
FIG. 3 shows one example of a method according to the present invention for using blank optical media.

FIG. 3 shows a general example of the use of blank optical media in a computer system. In Operation 151, a blank optical media is inserted into a drive system by a user. This blank optical media may be a blank CD-R disk or a blank CD-RW disk. In certain aspects of the present invention, the insertion of the optical media will cause a window to appear allowing the user to make at least one selection from selectable options which are ejecting the disk from the drive system or using the disk in the drive system and, as described below, may include further options. In Operation 153, after the insertion of the blank optical media, a media icon is shown on the desktop to indicate that the optical media has been mounted. The desktop will be well known to be the file management software's graphical user interface such as the Finder's graphical user interface which appears on Macintosh computer systems, such as those computers running Macintosh OS9. Another example of a desktop of a file management software's graphical user interface is the Windows 98 graphical user interface, including for example the graphical user interface provided by the Windows Explorer program which runs on Windows 98 or the capability of Windows 98 associated with the "My Computer" icon in Windows 98. These desktop interfaces allow the direct manipulation of files and/or folders with respect to storage icons. These desktop interfaces typically show icons which represent corresponding storage devices (e.g. the hard drive of a computer system, a floppy drive, a zip drive, etc). These icons may be opened by double clicking on the icons to reveal the contents of the storage device in a window and files may be added to or removed from these storage devices by performing conventional dragging and dropping operations or by performing cutting and pasting operations as is well known in the art.

Thus as shown in FIG. 3, after a blank optical media has been mounted and the icon for the media displayed on the desktop as shown in Operation 153, a user may manipulate files and/or folders relative to the icon in Operation 155 to write data to or remove data from the blank optical media. According to one exemplary embodiment of the present invention, the functionality provided by typical burning software is now provided in the operating system itself (e.g. the Macintosh OS9 operating system) such that the user may insert a blank optical media, such as a blank CD-R disk or a blank CD-RW disk into the disk drive and then proceed to treat the disk as if it was a conventional floppy disk or Zip disk which appears on the Macintosh's Finder desktop. After manipulating the files and/or folders in Operation 155 the user may then eject the media from the drive in Operation 157. According to one aspect of the present invention, upon instructing the system to eject the blank optical media from the drive, the system performs the various write operations in order to write the data rather than performing these write operations in Operation 155 while the user is manipulating the files using a graphical user interface by dragging and dropping or cutting and pasting the files relative to the icon. This is unlike prior systems, such as DirectCD which performs the writing operations as the user instructs them to occur; DirectCD does not wait until an eject command to perform these write operations. That is, with DirectCD, the write operations occur as the user instructs them to occur through dragging and dropping or cutting and pasting rather than after the user has instructed the system to eject the optical media.

Figure 4A:
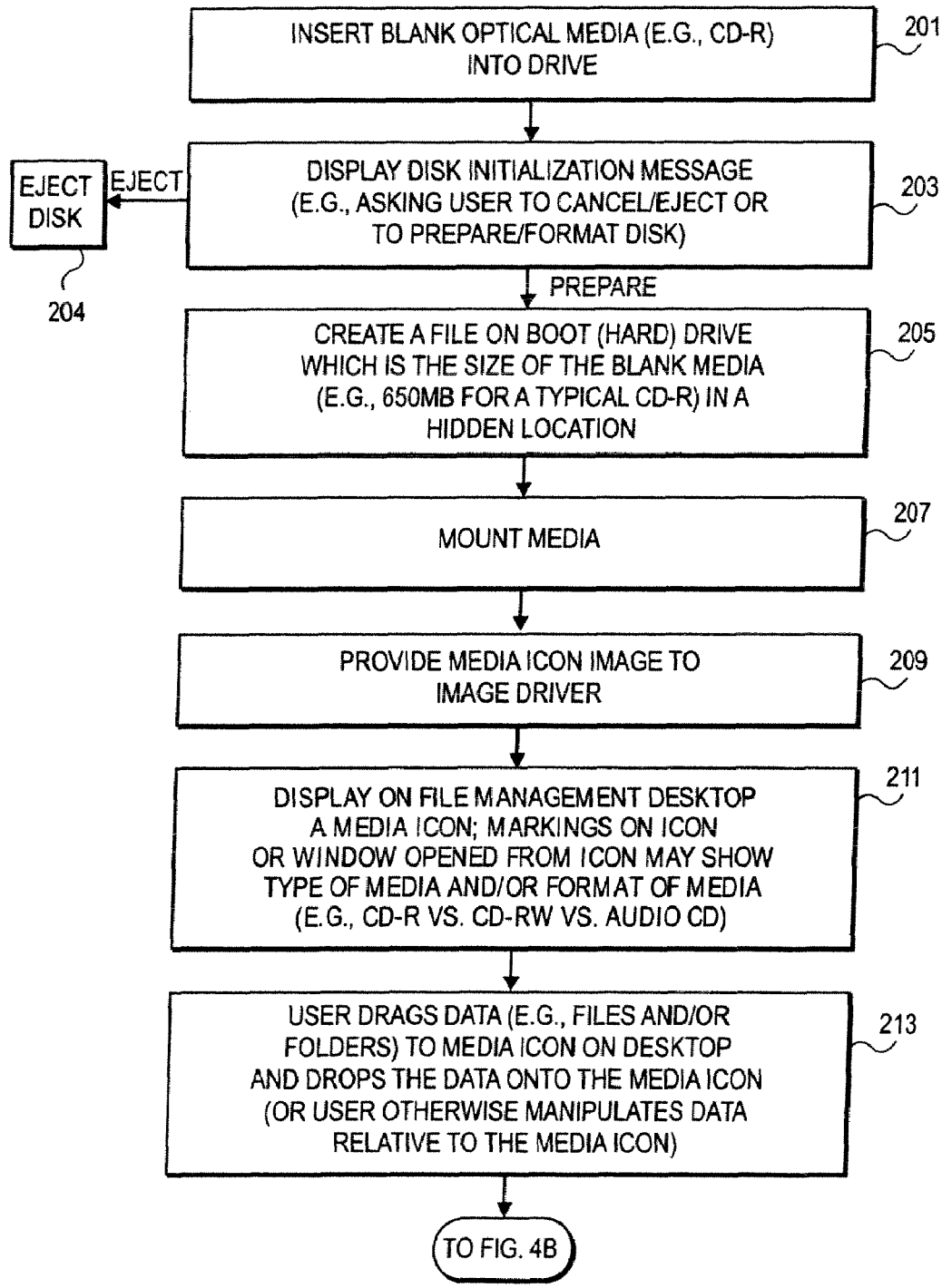
FIGS. 4a and 4b show an exemplary method of one particular embodiment of the present invention.
Figure 4B:
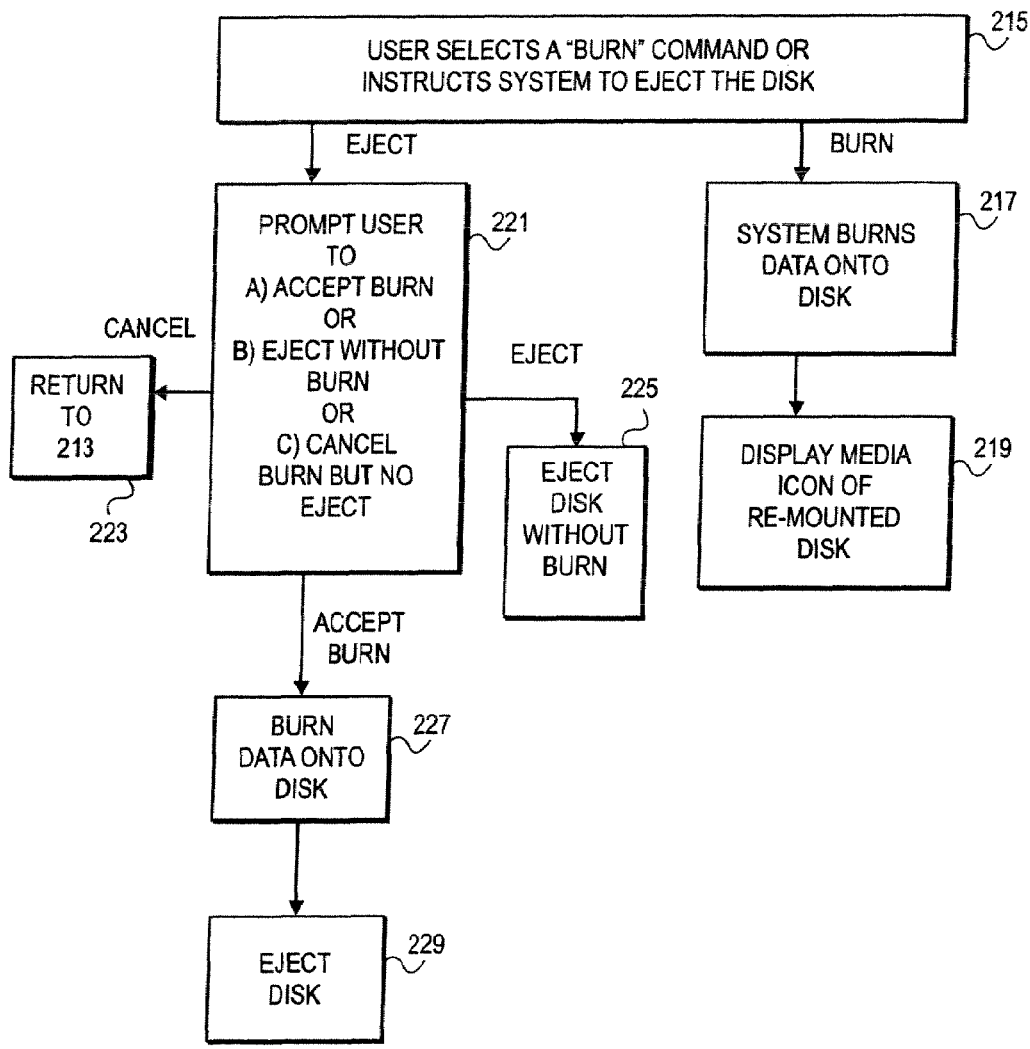

Referring now to FIGS. 4a and 4b, a method according to one particular embodiment of the present invention allows for the use of a blank optical media in a data processing system in what may be regarded as a more user friendly manner. The method in FIGS. 4a and 4b begins in Operation 201 in which a user inserts a blank optical media into a drive system which is coupled to the data processing system. Then in Operation 203, a disk initialization message is displayed to the user. This message is typically displayed within a window on a graphical user interface system and asks the user whether the user wishes to use the disk or to eject the disk or, in certain embodiments, may include other options such as launching an audio CD creation program. The use of the disk will be understood to be a use of the disk within the drive system to write (or erase) data to the disk. Thus the message may tell the user to click on a "prepare" button or a "format" button in order to use the disk. If a "launch" button is provided as an option in one embodiment, clicking on this button will cause the system to launch (e.g. cause the execution of) an audio CD creation program, such as a conventional audio CD creation program which has been previously installed on the system. If the user wants to cancel the use of the disk and to eject the disk the user may click on a cancel or eject button which causes an eject disk Operation 204. If the user selects to use the disk then processing proceeds from Operation 203 to Operation 205 in which a file on a boot drive (in one exemplary embodiment) is created. This data file may be the same size as the blank media and is typically stored in a hidden location on the boot drive. Thus, for example, if the data capacity of the blank media is 650 MB, then the data file may be 650 MB, and it will be used to store the various data files which are to be written to the optical media upon an eject operation or a burn operation as is further described below. Then in Operation 207, the media itself is mounted and in Operation 209 a media icon image is provided to an image driver so that in Operation 211, the file management desktop may now include a display of a media icon. There may be markings on the icon or a window opened from the icon (e.g. upon double clicking of the icon a window appears). These markings may show the type of media and/or the format of the media and may indicate the fact that the media does not yet contain copies of the data files which are shown within a window of the media (this is due to the fact that in this particular embodiment the data files are not written to the media until the user selects a burn command or instructs the computer to eject the disk as is further described below).

In Operation 213, the user may drag data to the user media icon on the desktop (or to a window opened from the icon) and drop the data onto the media icon (or onto the window opened from the icon). Alternatively, the user may perform other direct well known manipulation operations such as cutting and pasting operations commonly performed on Windows 98 computer systems or may perform other manipulation operations relative to the media data.

Then in Operation 215, the user may select a burn command provided as an option on the desktop's user interface or may instruct the system to eject the disk by, for example, dragging the disk to a trash can displayed on the desktop or by selecting the disk and selecting an eject command as is well known in the art. If the user selects a burn command then Operations 217 and 219 follow in which the system burns data onto the disk and then a media icon of the disk after a remounting operation is displayed. If the user selects an eject command or instructs the system to eject the disk in Operation 215 then Operation 221 follows. In Operation 221, a window is displayed which asks the user to select between one of three operations. One operation is to accept the burn in which case Operations 227 and 229 are performed. If the user selects an ejection option then Operation 225 occurs in which the disk is ejected without a burn. It should be noted that Operation 225 is unlike the prior art in that the user may have dragged and dropped files in Operation 213 to thereby write data or otherwise modify the disk but no such modifications occur because no burn is performed in Operation 225 if the user selects to eject the disk without burning the disk. If the user selects to cancel the burn but not to eject the disk then Operation 223 causes the system to return to Operation 213 as shown in FIG. 4b.

It will be appreciated that the foregoing method shown in FIGS. 4a and 4b is one particular example and that various alternative sequences of these operations may be achieved and that certain steps may be omitted in various alternative embodiments. For example, Operation 203 may be omitted in certain embodiments and Operation 205 may be omitted in certain embodiments.

Figure 5:
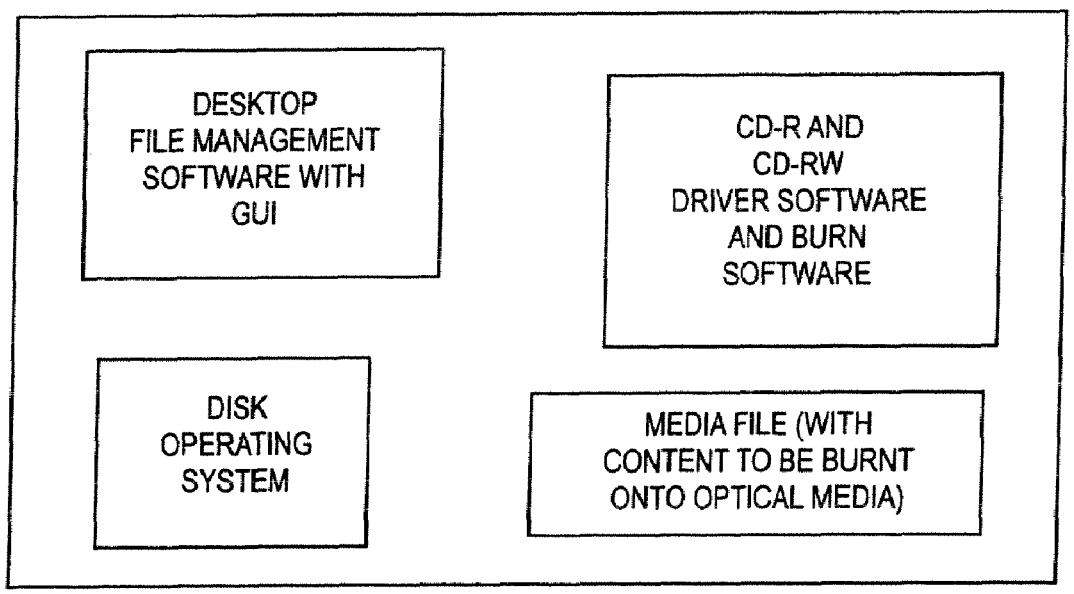
FIG. 5 shows an example of a computer readable media which may be used to store software and data which when executed by a data processing system causes the system to use various methods of the present invention.

FIG. 5 shows an example of a computer readable media, which may be used with a data processing system according to one embodiment of the present invention. The computer readable media contains data and executable software which when executed in the data processing system causes the system to perform at least one method of the present invention. As noted above, this executable software and data may be stored in various places including for example the ROM 107, the volatile RAM 105, the non-volatile memory 106, etc. Portions of this software and/or data may be stored in any one of these storage devices. The desktop file management with GUI represents the software which performs the file management functionality and also provides a graphical user interface. An example of this software is the Finder software used on Macintosh computers (e.g. Mac OS9). The disk operating system software is the operating system software which provides control of storage media so data can be written to and read from the storage devices such as hard drive, a floppy drive, a zip drive, etc. The CD-R and CD-RW driver software and burn software provides the functionality associated with reading and writing to optical disks such as CD-R and CD-RW disks. The media file shown in FIG. 5 represents the data file which was created in certain embodiments of the invention, such as the data file created in Operation 205 of FIG. 4a. This data file is typically used, in certain embodiments, as a data cache to write the data stored in this data file upon receiving the burn command or the eject in Operation 215 of FIG. 4*b*. This data file may, in one embodiment, contain the entire contents (either compressed or uncompressed) of the data which is to be copied to the disk (e.g. CD-R disk) or it may contain a reference (e.g. address or pointer) to the data or may contain a position of the data and a reference to the remainder of the data. The reference may be used to obtain the data to be copied onto the disk upon receiving a burn command or an eject command.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable medium which stores executable computer program instructions which when executed by a data processing system cause said system to perform a method, said method comprising:
   receiving a blank writeable media into a drive system which is coupled to said data processing system (DPS);
   creating automatically, in response to said receiving, a data file on a storage device which is coupled to said DPS prior to writing data to said blank writeable media, to store various data files to be written to said blank writeable media upon an ejection or burn operation;
   and displaying automatically, in response to said receiving and on a display device coupled to said DPS, a prompt to a user with at least one selectable option to take an action with respect to said blank writeable media.

2. A machine readable medium as in claim 1 wherein said data file represents an entire storage capacity of said blank writeable media.

3. A machine readable medium as in claim 2 wherein said data file represents a data cache for copying data from said data file to said blank writeable media when said blank writeable media is written to.

4. A machine readable medium as in claim 3 wherein said blank writeable media is a CD-R disk or a CD-RW disk or a DVD disk.

5. A machine readable medium as in claim 2 wherein said creating follows after said user selects to use said blank writeable media.

6. A machine readable medium as in claim 1 wherein said storage device is a boot drive for said DPS and contains an operating system for said DPS.

7. A data processing system comprising:
   means for receiving a blank writeable media into a drive system which is coupled to said data processing system (DPS);
   means for creating automatically, in response to said receiving, a data file on a storage device which is coupled to said DPS prior to writing data to said blank writeable media, to store various data files to be written to said blank writeable media upon an ejection or burn operation;
   and means for displaying automatically, in response to said receiving and on a display device coupled to said DPS, a prompt to a user with at least one selectable option to take an action with respect to said blank writeable media.

8. A DPS as in claim 7 wherein said data file represents an entire storage capacity of said blank writeable media.

9. A DPS as in claim 8 wherein said data file represents a data cache for copying data from said data file to said blank writeable media when said blank writeable media is written to.

10. A DPS as in claim 9 wherein said blank writeable media is a CD-R disk or a CD-RW disk or a DVD disk.

11. A DPS as in claim 8 wherein said creating follows after said user selects to use said blank writeable media.

12. A DPS as in claim 7 wherein said storage device is a boot drive for said DPS and contains an operating system for said DPS.

* * * * *